United States Patent
Ducousso et al.

(10) Patent No.: US 11,047,830 B2
(45) Date of Patent: Jun. 29, 2021

(54) DEVICE AND A METHOD FOR NON-DESTRUCTIVELY CHARACTERIZING A MATERIAL

(71) Applicant: SAFRAN, Paris (FR)

(72) Inventors: Mathieu Loic Ducousso, Moissy-Cramayel (FR); Frederic Jenson, Moissy-Cramayel (FR)

(73) Assignee: SAFRAN, Paris (FR)

(\*) Notice: Subject to any disclaimer, the term of this patent is extended or adjusted under 35 U.S.C. 154(b) by 203 days.

(21) Appl. No.: 16/470,748

(22) PCT Filed: Dec. 13, 2017

(86) PCT No.: PCT/FR2017/053539
§ 371 (c)(1),
(2) Date: Jun. 18, 2019

(87) PCT Pub. No.: WO2018/115640
PCT Pub. Date: Jun. 28, 2018

(65) Prior Publication Data
US 2020/0088689 A1      Mar. 19, 2020

(30) Foreign Application Priority Data
Dec. 19, 2016   (FR) ..................... 16 62786

(51) Int. Cl.
*B06B 1/02*   (2006.01)
*B06B 1/06*   (2006.01)
(Continued)

(52) U.S. Cl.
CPC ......... *G01N 29/221* (2013.01); *B06B 1/0284* (2013.01); *B06B 1/0625* (2013.01);
(Continued)

(58) Field of Classification Search
CPC . B06B 1/0284; B06B 1/0625; G01S 15/8922; G01S 15/8927; G01S 15/8913;
(Continued)

(56) References Cited

U.S. PATENT DOCUMENTS

| 4,523,471 A * | 6/1985 | Lee | G01N 29/24 310/334 |
| 8,390,181 B2 * | 3/2013 | Cerofolini | A61B 8/4494 310/369 |

(Continued)

OTHER PUBLICATIONS

International Search Report dated Mar. 21, 2018 in PCT/FR2017/053539 filed on Dec. 13, 2017.
(Continued)

*Primary Examiner* — Jacques M Saint Surin
(74) *Attorney, Agent, or Firm* — Oblon, McClelland, Maier & Neustadt, L.L.P.

(57) ABSTRACT

A characterization device for non-destructively characterizing a material includes emitter/receiver cells, each cell being able, in an emit mode, to emit ultrasound waves towards the material for characterizing, and, in a receive mode, to receive ultrasound waves that have been transmitted through the material. The non-destructive characterization device includes a ring made up of a plurality of adjacent angular sectors, each angular sector including ultrasound cells stacked in a radial direction of the ring.

9 Claims, 4 Drawing Sheets

(51) Int. Cl.
*G01N 29/22* (2006.01)
*G01N 29/24* (2006.01)
*G01N 29/44* (2006.01)

(52) U.S. Cl.
CPC ..... *G01N 29/2437* (2013.01); *G01N 29/4445* (2013.01); *G01N 2291/023* (2013.01); *G01N 2291/0289* (2013.01); *G01N 2291/048* (2013.01); *G01N 2291/106* (2013.01)

(58) Field of Classification Search
CPC .... G01N 29/221; G01N 29/07; G01N 29/041; G01N 2291/011; G01N 2291/02827; G01N 29/2437; G01N 29/4445; G01N 2291/263; G01N 2291/106; G01N 2291/023; G01N 2291/0289; G01N 2291/048
USPC .......................................................... 73/619
See application file for complete search history.

(56) References Cited

U.S. PATENT DOCUMENTS

| 9,113,835 B2* | 8/2015 | Li ........................ A61B 8/0825 |
| 2005/0124884 A1 | 6/2005 | Bolorforosh et al. |
| 2016/0116440 A1* | 4/2016 | Luo ...................... G01N 29/223 |
| | | 73/592 |
| 2016/0299106 A1* | 10/2016 | Khajeh ................ G01N 29/262 |
| 2020/0041644 A1* | 2/2020 | Brown ................ G01S 15/8995 |

OTHER PUBLICATIONS

Drinkwater, B. W. et al., "Ultrasonic arrays for non-destructive evaluation: A review," Elsevier, NDT&E International, vol. 39, 2006, pp. 525-541, XP27969035.

Martinez, O. et al., "A small 2D ultrasonic array for NDT applications," Elsevier, NTD&E International, vol. 36, 2003, pp. 57-63, XP4400326.

Degertekin, F. L. et al., "Annual-Ring CMUT Arrays for Forward-Looking IVUS: Transducer Characterization and Imaging," IEEE Transactions on Ultrasonics, Ferroelectrics, and Frequency Control, vol. 53, No. 2, Feb. 2006, pp. 474-482, XP11148779.

* cited by examiner

DEVICE AND A METHOD FOR NON-DESTRUCTIVELY CHARACTERIZING A MATERIAL

BACKGROUND OF THE INVENTION

The invention relates to a device for non-destructively characterizing a material and to a non-destructive characterization method performed by the device.

Non-destructive testing (NDT) and characterization methods are of great importance, in particular in the automobile, health, or indeed aviation fields. These methods can be used to characterize the integrity state of parts (e.g. airplane wings, engine parts), of structures (e.g. polycrystalline structures, multilayer structures), and more generally of materials at any time in their life cycle, e.g. during production, use, or maintenance. The use of these methods is even more important in the field of aviation since the structures in question, whether single pieces or assemblies, need to present characteristics that satisfy extremely severe standards.

Various known methods consist in applying ultrasound excitation as emission from a transducer into a material that is to be characterized, and then in detecting a signal characteristic of the material via one or more reception elements of the transducer, which signal is generated by the ultrasound excitation.

By way of example, Document EP 2 440 140 describes an ultrasound transducer in the form of a one-dimensional strip for which a material is characterized by the propagation of ultrasound waves through the material. Nevertheless, such a transducer is not suitable for characterizing a material in all directions of three-dimensional space. However, such characterization is found to be essential, in particular for characterizing materials that are anisotropic. A solution that could be envisaged for addressing this problem could then consist in moving the transducer manually, or indeed in providing a mechanical assembly for moving the transducer, to occupy various three-dimensional or angular configurations. Nevertheless, such a solution is found to be limited since it involves either making complex mechanical assemblies, with the transducer being positioned in approximate and not very accurate manner when taking measurements, and it also requires a time for characterization of the material that is long, since such a transducer needs to be moved either manually or mechanically for each direction of measurement.

The use of ultrasound transducers made in the form of an array of emitter/receiver elements is also known in the prior art. By way of example, Document WO 2015/011383 describes in particular a transducer in the form of an array of emitter/receiver elements that can be activated selectively in order to form a detection surface providing a pattern in the form of a cross. Such a transducer can be used in particular to test a weld zone by analyzing ultrasound waves reflected on the weld zone. Because of its array shape, such a solution requires a large number of emitter/receiver elements. Nevertheless, some of those elements are not always used for forming the detection surface of the transducer. Such a transducer is then found to be expensive in terms of cost of fabrication, given the large number of elements that make it up. Furthermore, the large number of receiver elements in such a transducer involves a large quantity of data being acquired, which can slow down testing of the material that is to be characterized, in particular while transferring that data to a post-treatment unit.

Specifically, present-day solutions for characterizing a material do not enable an ultrasound transducer to be proposed that is simultaneously reliable, accurate, fast, and inexpensive.

Object and Summary of the Invention

An object of the present invention is to remedy the above-mentioned drawbacks.

To this end, the invention proposes a characterization device for non-destructively characterizing a material, the device comprising emitter/receiver cells, each cell being configured in an emit mode to emit ultrasound waves towards the material for characterizing, and in a receive mode to receive ultrasound waves that have been transmitted through said material, the non-destructive characterization device comprising a ring made up of a plurality of adjacent angular sectors, each angular sector comprising ultrasound cells stacked in a radial direction of the ring, the device further comprising control means comprising:

a first selector module configured to select an angular sector as an emit angular sector;

a second selector module configured to select a set of adjacent angular sectors as receive angular sectors, the second module being configured to select said set over an angular range that is diametrically opposite the emit angular sector;

a first switch module configured to switch all of the cells in the receive angular sectors into receive mode; and a second switch module configured to switch one cell at a time in alternation in the emit angular sector into emit mode;

the control means being configured to actuate the modules for different angular sectors.

Advantageously, the ring of the non-destructive characterization device is hollow in its center, i.e. without any emitter/receiver cells. It is thus possible to place the ring in contact with or around the material for characterizing. In addition, the emitter/receiver cells of such a device can be selected individually and controlled to switch into an emit mode or into a receive mode. It thus becomes possible to use the ring of the device to perform either sequentially or else in combination both a radial scan and also a scan turning around the material for characterizing. The material can thus be characterized in any angular direction without moving the material or the characterization device after taking each angular measurement, with this being made possible by switching the emitter/receiver cells. The device thus makes it possible to avoid complex mechanical assemblies seeking to characterize the material in different directions, and it makes it possible to obtain much greater accuracy for the measurements than is possible with mechanical assemblies. Such a device then presents reduced overall size and also presents the possibility of reducing the number of emitter/receiver cells making it up, whenever the material for testing presents structural symmetries. Such a device can thus be of reduced weight, the volume of data for processing can be smaller, and the accuracy of the measurements can be increased, while also reducing the cost of fabrication. In addition, such a device enables a considerable saving in time to be obtained for taking measurements to characterize the material, since the transition between two measurements is performed merely by switching the emitter/receive cells.

In another aspect, in the characterization device, each angular sector has the same number of cells.

In another aspect, in the characterization device, the ring comprises a first angular range and a second angular range, each angular sector of the first angular range having a number of cells that is less than the number of cells in the angular sectors of the second angular range.

In another aspect, in the characterization device, the angular sectors of the first angular range and of the second angular range extend from the same inner circumferential edge of the ring.

In another aspect, in the characterization device, the angular sectors of the first angular range and of the second angular range extend from the same outer circumferential edge of the ring.

In another aspect, in the characterization device, the first angular range is less than or equal to 180°.

In another aspect, in the characterization device, the first angular range is strictly greater than 180°.

The invention also provides a characterization method for non-destructively characterizing a material, the method being performed by the non-destructive characterization device as described above, the method comprising:

a) a step of positioning the device in contact with or around said material;

b) selecting an angular sector as an emit angular sector;

c) selecting a set of adjacent angular sectors as receive angular sectors, said set being selected over an angular range that is diametrically opposite the emit angular sector;

d) switching all of the cells of the receive angular sectors into receive mode;

e) a step of emitting ultrasound waves by a cell in emit mode towards said material, thereby generating ultrasound waves that are transmitted through said material;

f) a step of the cells in receive mode receiving the ultrasound waves transmitted through said material; and g) a step of processing ultrasound waves transmitted through said material after the step of receiving them.

In another aspect, the characterization method further comprises:

h) switching in alternation one cell of the emit angular sector into emit mode.

In another aspect, in this method, only one cell of the emit angular sector is switched into emit mode at a time.

In another aspect, after each step of processing transmitted ultrasound waves, the characterization method comprises repeating steps b) to f) for successive angular sectors.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

Figure 1:
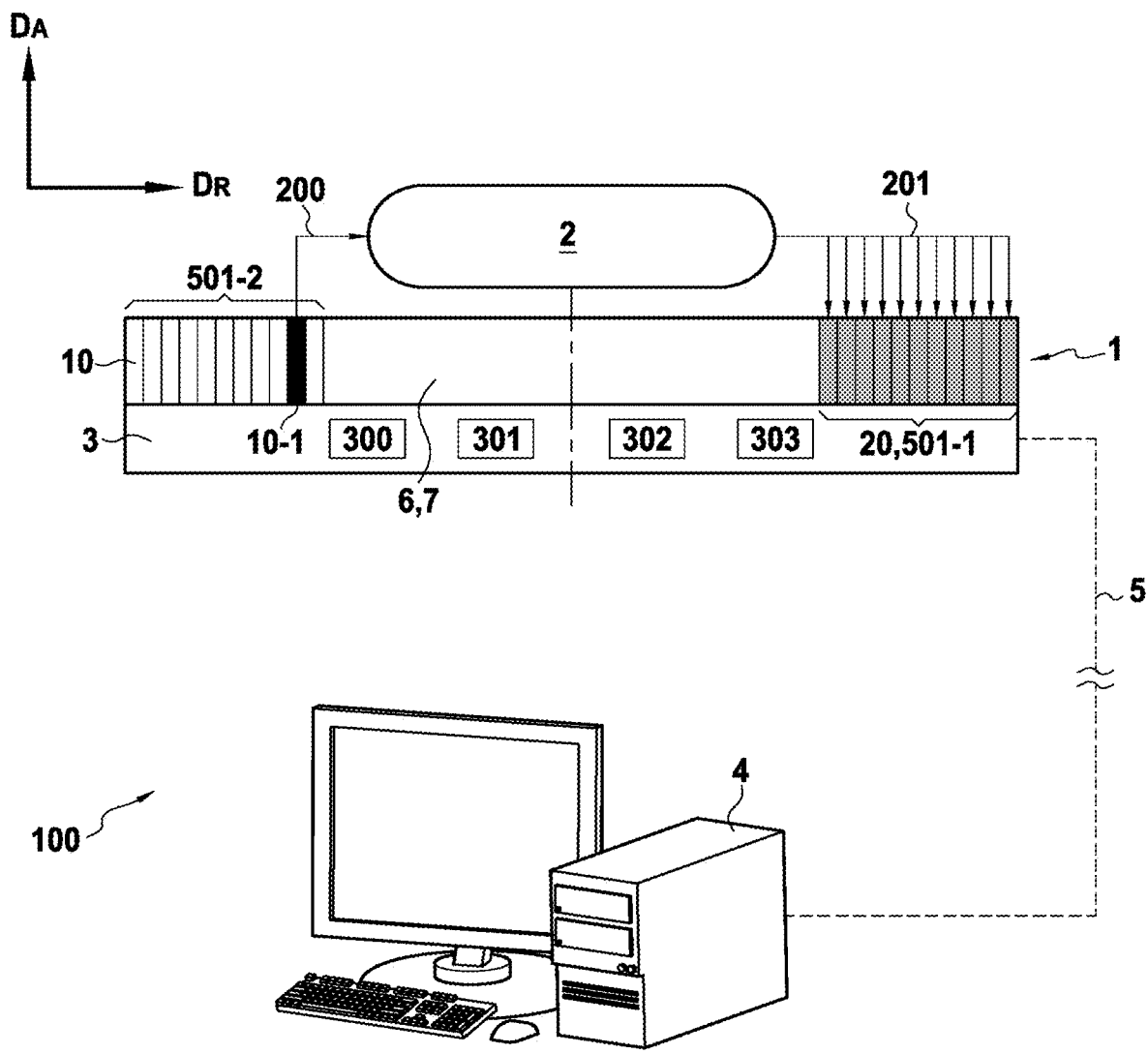
FIG. 1 is a diagram showing a device for non-destructive characterization of a material.
Figure 2A:
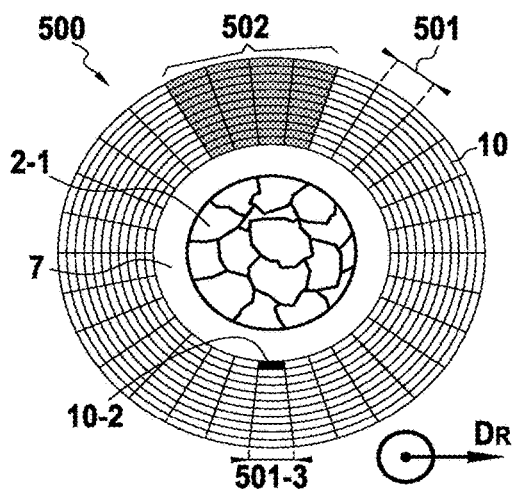
FIGS. 2A to 2E show variant steps in a first scan performed by a transducer of the non-destructive characterization device in order to characterize a material.
Figure 2B:
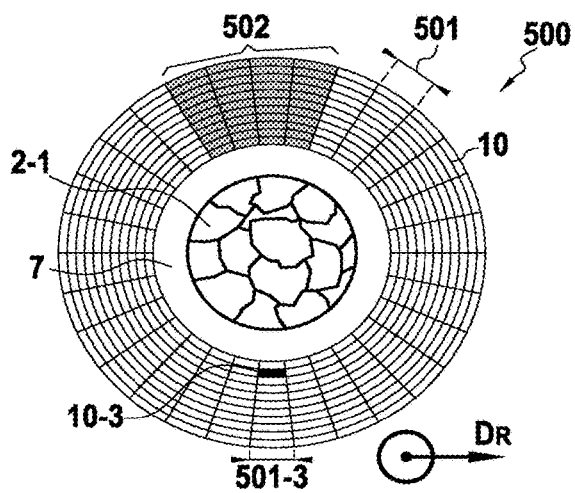
Figure 2C:
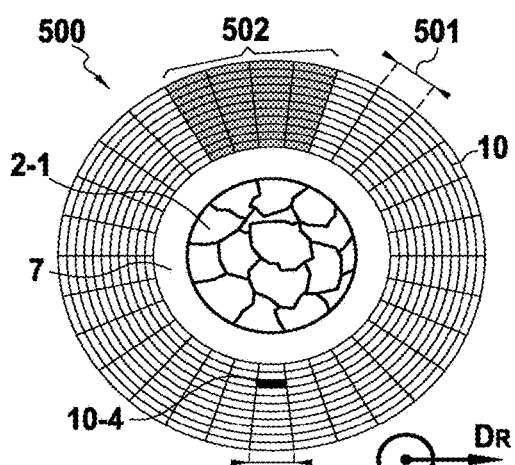
Figure 2D:
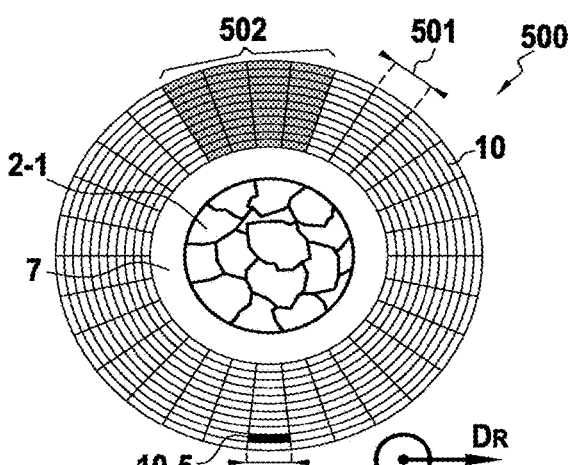
Figure 2E:
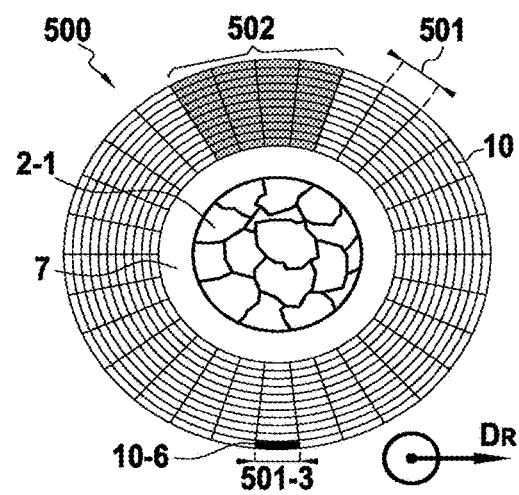
Figure 3A:
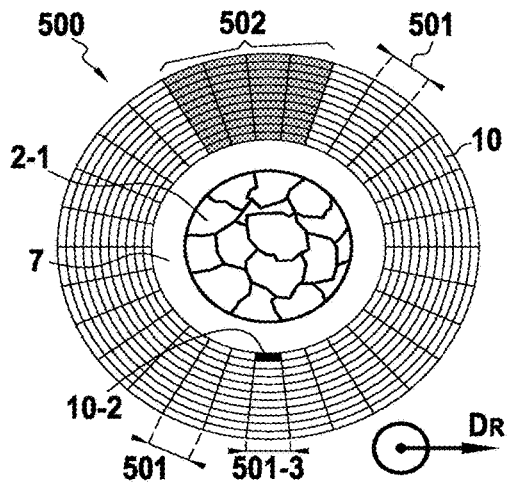
FIGS. 3A to 3E show various steps in a second scan performed by the transducer of the non-destructive characterization device in order to characterize a material.
Figure 3B:
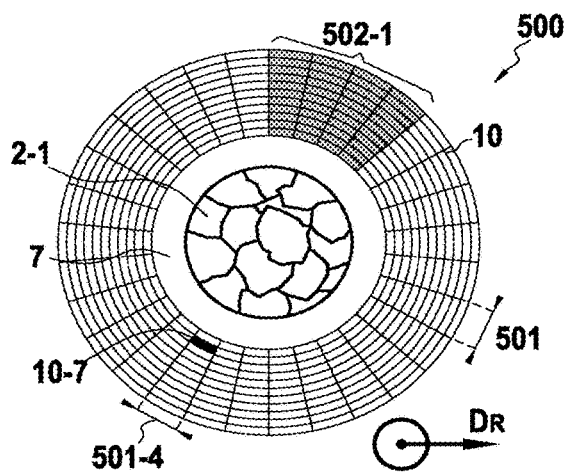
Figure 3C:
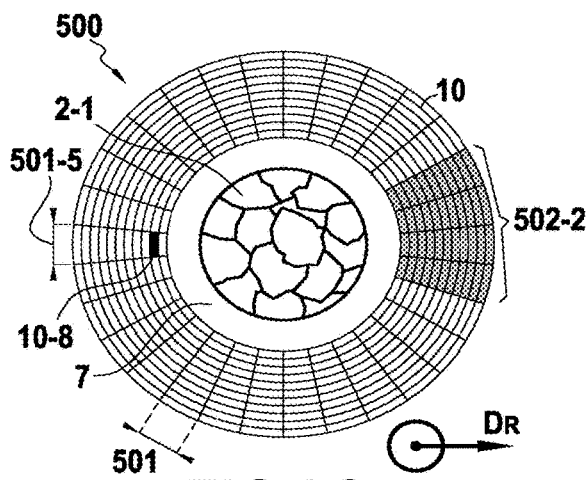
Figure 3D:
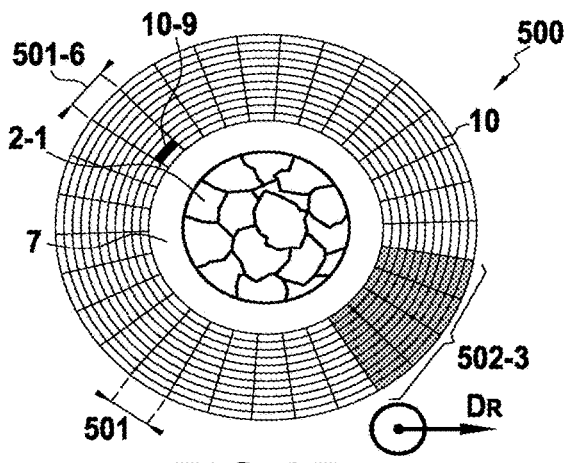
Figure 3E:
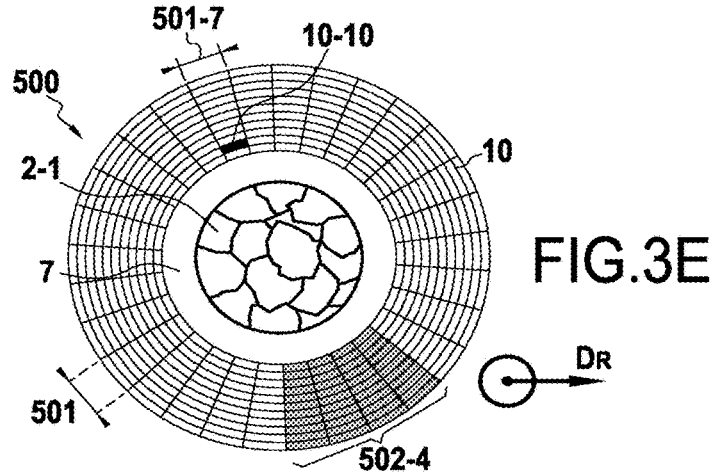

FIG. 1 shows a device 100 for non-destructive characterization by ultrasound waves in order to determine the characteristics of a material 2. The device 100 comprises an ultrasound transducer 1, i.e. a probe, having a plurality of emitter/receiver cells 10. Each emitter/receiver cell 10 may be switchable into an emit mode for emitting ultrasound waves towards the material 2 for characterizing, or into a receive mode for receiving ultrasound waves that have been transmitted and/or guided through said material 2. The transducer 1 is associated with control means 3 suitable for selecting and switching any cell 10 of the ultrasound transducer 1 into an emit mode, into a receive mode, or indeed to leave the cell 10 inactive. In the example shown, and as described in greater detail below, the control means 3 have switched one cell 10-1 (the cell marked in black) into emit mode and a set 20 of cells 10, specifically eleven cells, into receive mode (cells marked in gray), while the other cells 10 have been left inactive (cells marked in white).

The transducer 1 thus presents an ultrasound emission/reception surface made up of the cells 10, which surface is plane in shape and can be applied directly in contact against the material 2 for characterizing. In other examples, the transducer 1 could come indirectly into contact with the material 2 via a medium (e.g. a plexiglass relay) or it could be used in immersion around the material 2 for testing in order to facilitate the propagation of ultrasound waves.

In known manner, the emitter/receiver cells 10 are piezo-electric vibrators. Each transit cell of the transducer 1 transforms an electrical signal received from the control means 3 into an ultrasound signal that is transmitted (arrow 200) to the material 2. Each receive cell of the transducer 1 transforms an ultrasound signal that has been received (arrows 201) from the material 2 into an electrical signal that is then sent to a processor unit 4, the electrical signal being transmitted to the unit over a wired connection 5, for example. The processor unit 4 has means for processing the signal coming from the cells in receive mode. By way of example, the processor unit 4 can extract phase velocity variations as a function of the frequency of the ultrasound waves that have propagated through the material 2, can correlate them with the emitter/receiver cells 10, can generate three-dimensional image data, can detect the sizes and/or positions of any defect relating to the material 2 under testing, and can display the results of the detection, e.g. in the form of a map. The waves transmitted through the material 2 are guided waves, e.g. Lamb waves. Advantageously, these waves present wavelengths that are comparable to the dimensions of the material 2 for testing and they are thus guided in the material 2. Reception of these waves then enables the material 2 to be characterized. By way of example, it is possible by means of the processor unit 4 to resolve the signal received by each receive cell into singular values and to deduce therefrom the dispersion curves for the received signals. In general manner, the non-destructive characterization device 100 can be used for characterizing the properties of any material 2, and in particular of materials that are anisotropic. By way of example, the materials 2 for characterizing may be a single piece structure, a polycrystalline structure (e.g. titanium), or a structure in the form of an assembly. By way of example, the properties of the material 2 for characterizing may relate to the thicknesses of layers for a multilayer material, its elastic constants, its elastic functions, its losses of thickness due to corrosion, or indeed its stiffness matrix.

In accordance with the invention, the ultrasound transducer 1 is in the form of a ring 500, an embodiment of which is shown in FIGS. 2A to 3E. In this example, the ring 500 is defined relative to an axial direction DA and it is made up of a plurality of angular sectors 501 that are adjacent in a circumferential direction. In a radial direction DR of the ring 500, each angular sector 501 comprises a stack of emitter/receiver cells 10. By way of example, in FIG. 1, the set 20 of cells 10 in receive mode constitutes an angular sector 501-1 that is diametrically opposite to an angular sector 501-2 that includes the cell 10-1 that is in emit mode. Diametrically opposite angular sectors 501, such as the angular sectors 501-1 and 501-2, may optionally be separated by a barrier 6 that prevents direct ultrasound transmission between the emit portion, formed in this example by the cell 10-1 in emit mode, and the receive portion, formed in this example by the set 20 of cells in receive mode. More generally, the transducer 1 does not have emitter/receiver cells 10 in its central portion 7, which is hollow, as shown in all of the figures.

FIGS. 2A-3E show various steps for testing a material 2, in this example a polycrystalline structure 2-1.

During an initial step, the device 100 is positioned in direct or indirect contact with the material 2 for characterizing, specifically the polycrystalline structure 2-1. Alternatively, the device is positioned in immersion around the material 2 for characterizing. The dimensions of the ring 500 and of its emitter/receiver cells 10 are determined beforehand so that the central portion 7 presents dimensions that are greater than those of the material 2 for characterizing, which material is placed in contact with or facing the central portion 7. Likewise, the frequencies used by the emitter/receiver cells 10 are selected as a function of the parameters of the material 2 that is to be tested and as a function of the scale of the characterization that is to be investigated. By way of example, for the polycrystalline structure 2-1, it is possible to perform characterization at the scale of a single grain, or at the scale of a packet of grains, depending on the ultrasound frequencies selected. Nevertheless, the ultrasound frequencies are selected so as to obtain wavelengths that present dimensions that are comparable with the material 2 for characterizing, so as to obtain guided waves (e.g. surface waves and/or body waves) through the material 2.

Once the device 100 is in position, the material 2 is subjected to two scans enabling it to be characterized.

A first scan, which is of radial type, is shown in FIGS. 2A to 2E. During this scan, for a given angular sector 501-3, only one cell 10-2, 10-3, 10-4, 10-5, or 10-6 is selected in alternation and then switched into emit mode. A set 502 comprising a plurality of adjacent sectors 501 is selected, and all of the cells 10 of the set 502 are switched into receive mode. The set 502 is always selected over an angular range that is diametrically opposite the angular sector 501-3 having the cell 10-2, 10-3, 10-4, 10-5, or 10-6 that is switched into emit mode. Furthermore, and as explained, care is taken to ensure that this set 502 is always made up of at least two adjacent angular sectors 501.

The first scan of characterizing the material 2 then consists in switching each cell 10-2, 10-3, 10-4, 10-5, and 10-6 in alternation into emit mode so as to emit ultrasound waves towards said material 2, thereby generating waves that are transmitted and/or guided through said material 2. These guided waves that are transmitted and/or guided through the material 2 are then received by the various cells 10 of the set 502, which cells are switched into receive mode. The step of processing the ultrasound waves received by the cells 10 can then be performed by the processor unit 4.

In practice, the selecting and switching of cells into emit mode or receive mode is performed by the control means 3. By way of example, these control means 3 may comprise:
- a first selector module 300 configured to select an angular sector 501 as the emit angular sector (e.g. the angular sector 501-3 in FIGS. 2A-2E);
- a second selector module 301 configured to select a set 502 of adjacent angular sectors 501 as receive angular sectors, this set 502 being selected to cover an angular range that is diametrically opposite the emit angular sector;
- a first switch module 302 configured to switch the set 502, i.e. all of the cells in the receive angular sectors, into receive mode; and
- a second switch module 303 configured to switch the cells in the emit angular sector in alternation into emit mode. The second switch module 303 may in particular be configured to switch only one cell at a time into emit mode.

The modules 300, 301, 302, and 303 are implemented by electronic or software means, the control means 3 being capable of actuating some or all of these modules for every angular sector 501 of the ring 500.

Advantageously, for this first scan, selecting a set 502 of receive cells over an angular range that is diametrically opposite a cell in emit mode enables the propagation of ultrasound waves through the material 2 to be probed along two mutually normal wave vectors, unlike existing one-dimensional transducers. This characterization along two normal wave vectors comes from the fact that the set 502 is made up of a plurality of adjacent angular sectors 501.

Furthermore, selecting and switching one emit cell in a given angular sector 501 in alternation during this first scan makes it possible, after processing the received signals (e.g. by resolution into a singular value), to obtain dispersion curves for the guided modes through the material 2 for characterizing.

A second scan is shown in FIGS. 3A to 3E. As can be seen in these figures, this second scan is an angular scan that consists in performing the above-described first scan over different angular sectors 501 of the ring 500. Different angular sectors 501-3, 501-4, 501-5, 501-6, and 501-7 are selected in succession for emission and at least one cell 10-2, 10-7, 10-8, 10-9, 10-10 in these sectors is switched into emit mode. Sets 502, 502-1, 502-2, 502-3, and 502-4 of angular sectors diametrically opposite the angular sectors 501-3, 501-4, 501-5, 501-6, and 501-7 for emission are then selected as receive sets and all of their cells are switched into receive mode. The second scan is then performed by turning the first scan about the axial direction DA of the ring. This turning, second scan is performed over a predetermined angular scan range, which range may for example be selected as a function of the material 2 for characterizing. It should be observed in this example that each set 502, 502-1, 502-2, 502-3, and 502-4 is made up of four successive angular sectors. Nevertheless, this number is selected solely by way of illustration, and these sets could be made up of a greater or smaller number of angular sectors 501. Nevertheless, care should be taken in the first and second scans to ensure that a set 502 is always formed comprising a plurality of angular sectors 501 in order to probe propagation of ultrasound waves through the material 2 along two mutually normal wave sectors.

As set out above, the material 2 for characterizing is subjected to two scans. Thus, in order to characterize the material 2, the first and second scans may be performed in succession or in combination by the control means 3. By way of example, all of the cells in a given emit sector (e.g. the sector 501-3) may be switched in turn, then the second scan changes the emit sector by subsequently selecting a different angular sector 501, e.g. an adjacent sector. In another example, a cell of a first angular sector is used in emit mode, then the second scan switches a cell in a different second angular sector into emit mode, without all of the cells in the first angular sector necessarily being switched into emit mode. This example can be seen in FIGS. 3A to 3E, where it can be seen that at each step only one cell 10-2, 10-7, 10-8, 10-9, or 10-10 in an angular sector 501-3, 501-4, 501-5, 501-6, or 501-7 that is distinct from the preceding sector is selected and switched in turn into emit mode.

Advantageously, the second scan serves to probe propagation of ultrasound waves guided through the material 2 along all possible angles relative to the axial direction DA of the ring. After the received signals have been processed, this scan may serve in particular to determine a complete stiffness matrix for the tested material 2.

The angular scan range used during the second scan is a function of the material 2 for characterizing. By way of example, for certain materials 2, it is possible to limit turning of the second scan to an angular range equal to 180°, or indeed to reduce this angular range to an angle of less than 180° for materials 2 that present structural symmetries.

It might thus be possible to reduce the number of emitter/receiver cells 10 in the device 100. Such a reduction in the number of emitter/receiver cells 10 can be advantageous, in particular in terms of the cost of fabricating the device 100, of reducing its weight, and of reducing the quantity of data that is received for transmitting to the processor unit 4, thus leading to faster analysis of the material 2 that is to be characterized.

It should be observed that the ring 500 in the above-described figures corresponds to a particular embodiment in which each angular sector 501 has the same number of cells. Other embodiments of rings 500-1, 500-2, 500-3, and 500-4 presenting smaller numbers of emitter/receiver cells 10 are shown in FIGS. 4A-4D. For the purposes of illustration, the materials 2 that are to be characterized, as shown in these figures, are respectively a structure 2-2 that has been assembled by welding, and a structure 2-3 that has been assembled by adhesive.

Figure 4A:
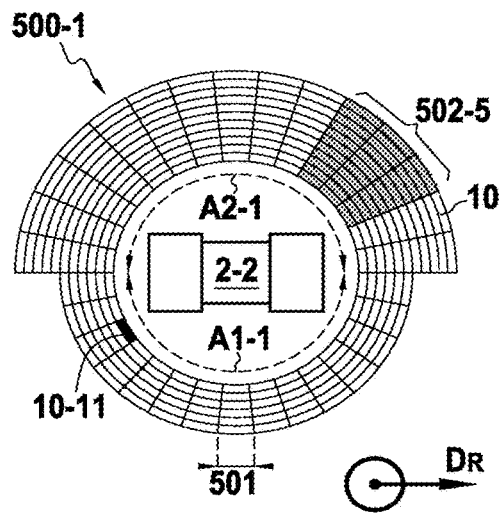
FIGS. 4A to 4D show differing variant embodiments of the transducer of the non-destructive characterization device.
Figure 4B:
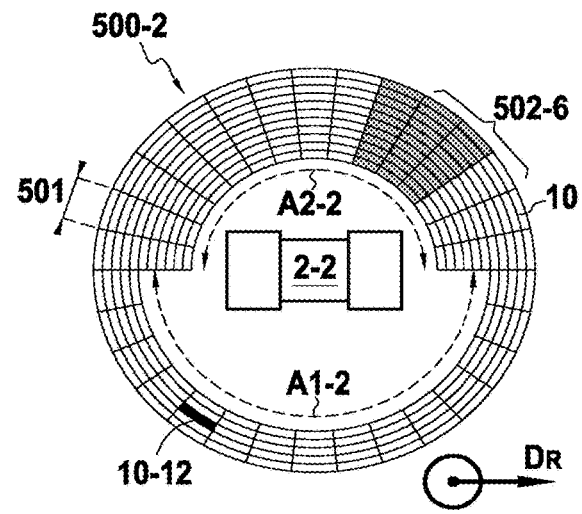

FIGS. 4A and 4B show embodiments in which a ring 500-1, 500-2 has both a first angular range A1-1, A1-2 and also a second angular range A2-1, A2-2, both of which are equal to 180°. In the embodiment shown, the number of cells 10 present in each angular sector 501 of the first angular range A1-1, A1-2 is less than the number of cells contained in each angular sector of the second angular range A2-1, A2-2. If the angular sectors of the first angular range A1-1, A2-2 are used in succession for selecting and switching a cell 10 into emit mode, then the angular sectors of the second angular range A2-1, A2-2 are used for setting up sets of cells in receive mode over an angular range that is diametrically opposite the cell in emit mode. By way of example, these figures show cells 10-11 and 10-12 that are switched into emit mode and sets 502-5 and 502-6 of diametrically opposite angular sectors, with each set 502-5 and 502-6 in this example being made up of three angular sectors, in which the cells are switched into receive mode. As can be seen in FIG. 4A, the angular sectors of the first angular range A1-1 and of the second angular range A2-1 extend from the same inside circumferential edge of the ring 500-1. The distance between the cells in emit mode and the cells in receive mode is thus minimized. Conversely, in FIG. 4B, the angular sectors of the first angular range A1-2 and of the second angular range A2-2 extend from the same outer circumferential edge of the ring 500-2. The distance between the cells in emit mode and the cells in receive mode is then maximized.

Figure 4C:
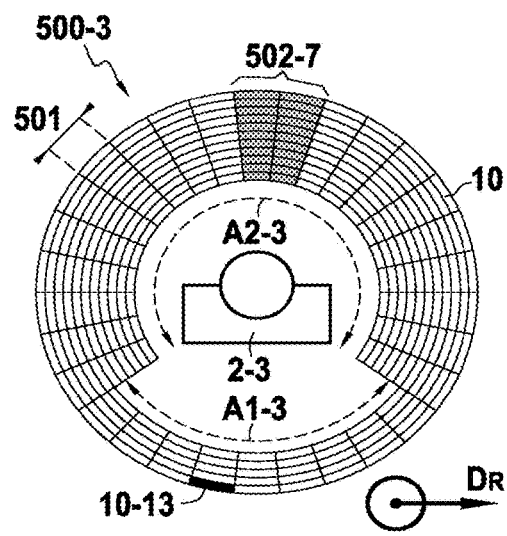
Figure 4D:
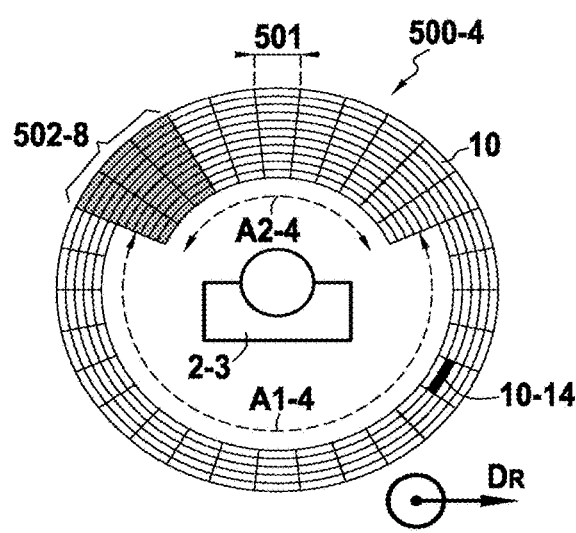

FIGS. 4C and 4D show respectively other embodiments for the ring 500-3 or 500-4 in which the angular sectors of a first angular range A1-3 or A1-4 extend from the same outer circumferential edge of the ring 500-3 or 500-4. In another example that is not shown, the angular sectors of the first angular range may extend from the same inner circumferential edge of the ring 500-3 or 500-4. In these figures, the number of cells 10 present in each angular sector of the first angular range A1-3, A1-4 is less than the number of cells 10 present in each angular sector of a second angular range A2-3, A2-4. In FIG. 4C, the first angular range A1-3 is less than 180°. In FIG. 4D, the first angular range A1-4 is greater than 180°. If the angular sectors of the first angular range A1-3, A1-4 are used in succession for selecting and switching one cell 10 into emit mode, then the angular sectors of the second angular range A2-3, A2-4 are used to form sets of cells in receive mode over an angular range diametrically opposite the cell in emit mode. By way of example, these figures show cells 10-13 and 10-14 switched into emit mode and sets 502-7 and 502-8 of angular sectors, each made up of three angular sectors in this example, in which the cells are switched into receive mode.

Advantageously, all of the above-described embodiments can be applied to characterizing any material 2.

By way of example, for characterizing a polycrystalline structure 2-1, these embodiments serve to collect via the receive portion of the transducer 1 a data set that is sufficient for characterizing the orientations of the grains in the structure by ultrasound tomography. Depending on the parameters of the device 100 (e.g. ultrasound frequencies used), the processing of the receive signals by the processor unit 4 then serves to characterize the polycrystalline structure 2-1 at the scale of a single grain or of a packet of grains.

In another example, it may be necessary for structures that are assembled, e.g. a structure 2-2 assembled by welding or a structure 2-2 assembled by adhesive, to test the quality of existing junctions (e.g. a spot of adhesive, welding). The processing of the received signals by the processor unit 4 then serves to determine and evaluate the stiffness matrix of such structures. In addition, since the propagation of ultrasound waves through the material 2 for characterizing is probed in all angular directions (as a result of the turning, second scan) and in two mutually normal propagation directions (by means of the radial, first scan, a plurality of angular sectors being used for reception), the embodiments proposed make it possible to evaluate very accurately the presence of a crack, and more generally any information concerning the material 2 and oriented in a preferred direction.

A third application example for the embodiments relates to using images to characterize a material 2 that presents losses of thickness associated with being thinned by corrosion. The processor unit 4 measures the speeds of the guided modes of the ultrasound waves guided through the material 2, and by using measurements taken in all angular directions, it can detect modes that propagate at different speeds, these different speeds revealing a loss of thickness in the material 2. The processor unit 4 can then make use of a tomographic reconstruction algorithm to show the loss of thickness in the material 2.

The invention claimed is:

1. A characterization device for non-destructively characterizing a material, the device comprising:
    emitter/receiver cells, each cell being configured in an emit mode to emit ultrasound waves towards the material for characterizing, and in a receive mode to receive ultrasound waves that have been transmitted through said material;

a ring made up of a plurality of adjacent angular sectors, each angular sector comprising ultrasound cells stacked in a radial direction of the ring; and control means comprising:
- a first selector module configured to select an angular sector as an emit angular sector;
- a second selector module configured to select a set of adjacent angular sectors as receive angular sectors, the second module being configured to select said set over an angular range that is diametrically opposite the emit angular sector;
- a first switch module configured to switch all of the cells in the receive angular sectors into receive mode; and
- a second switch module configured to switch one cell at a time in alternation in the emit angular sector into emit mode;

the control means being configured to actuate the modules for different angular sectors.

2. The characterization device according to claim 1, wherein each angular sector has the same number of cells.

3. The characterization device according to claim 1, wherein the ring comprises a first angular range and a second angular range, each angular sector of the first angular range having a number of cells that is less than the number of cells in the angular sectors of the second angular range.

4. The characterization device according to claim 3, wherein the angular sectors of the first angular range and of the second angular range extend from the same inner circumferential edge of the ring.

5. The characterization device according to claim 3, wherein the angular sectors of the first angular range and of the second angular range extend from the same outer circumferential edge of the ring.

6. A characterization method for non-destructively characterizing a material, the method being performed by the non-destructive characterization device according to claim 1, the method comprising:
- a) positioning the device in contact with or around said material;
- b) selecting an angular sector as an emit angular sector;
- c) selecting a set of adjacent angular sectors as receive angular sectors, said set being selected over an angular range that is diametrically opposite the emit angular sector;
- d) switching all of the cells of the receive angular sectors into receive mode;
- e) emitting ultrasound waves by a cell in emit mode towards said material, thereby generating ultrasound waves that are transmitted through said material;
- f) receiving, by the cells in receive mode, the ultrasound waves transmitted through said material; and
- g) processing ultrasound waves transmitted through said material after the receiving.

7. The characterization method according to claim 6, further comprising:
- h) switching in alternation one cell of the emit angular sector into emit mode.

8. The characterization method according to claim 7, wherein only one cell of the emit angular sector is switched into emit mode at a time.

9. The characterization method according to claim 7, further comprising, after each of the processing transmitted ultrasound waves, repeating steps b) to f) for successive angular sectors.

* * * * *